(12) United States Patent
Wolters (10) Patent No.: US 9,938,677 B2
(45) Date of Patent: Apr. 10, 2018

(54) IMPACT-RESISTANT AND ENERGY-ABSORBING ITEM OF STREET FURNITURE

(71) Applicant: Gerard Wolters, Scherpenheuvel-Zichem (BE)

(72) Inventor: Gerard Wolters, Scherpenheuvel-Zichem (BE)

(73) Assignee: Impact Recovery Systems, Inc., San Antonio, TX (US)

( * ) Notice: Subject to any disclaimer, the term of this patent is extended or adjusted under 35 U.S.C. 154(b) by 0 days.

(21) Appl. No.: 15/021,294

(22) PCT Filed: Sep. 19, 2014

(86) PCT No.: PCT/EP2014/070029
§ 371 (c)(1),
(2) Date: Mar. 11, 2016

(87) PCT Pub. No.: WO2015/051984
PCT Pub. Date: Apr. 16, 2015

(65) Prior Publication Data
US 2016/0222609 A1    Aug. 4, 2016

(30) Foreign Application Priority Data
Oct. 7, 2013   (BE) .................................. 2013/0668

(51) Int. Cl.
*E01F 9/627* (2016.01)
*F16F 7/02* (2006.01)
*F16F 7/08* (2006.01)
*E04B 1/98* (2006.01)

(52) U.S. Cl.
CPC .............. *E01F 9/629* (2016.02); *E04B 1/985* (2013.01); *F16F 7/026* (2013.01); *F16F 7/082* (2013.01); *F16F 7/085* (2013.01)

(58) Field of Classification Search
USPC ....... 248/519, 523, 524, 526, 514, 560, 562, 248/566, 570, 636, 346.01, 346.06, 346.5, 248/346.03; 40/606.01, 606.14, 606.15, 40/607.04, 607.1; 267/136, 140.5, 141, 267/141.2, 141.3
See application file for complete search history.

(56) References Cited

U.S. PATENT DOCUMENTS

| | | | | |
|---|---|---|---|---|
| 3,204,913 A | * | 9/1965 | Lawrence | F16F 7/14 248/568 |
| 5,354,031 A | * | 10/1994 | Bilotti | E04H 12/2238 248/511 |
| 5,788,405 A | * | 8/1998 | Beard | E01F 9/692 116/63 P |

FOREIGN PATENT DOCUMENTS

JP          5094249 B2 * 12/2012  ............... E01F 9/00

* cited by examiner

*Primary Examiner* — Alfred Wujciak
(74) *Attorney, Agent, or Firm* — Thomas E. Sisson

(57) ABSTRACT

The invention relates to an impact-resistant and energy-absorbing item of street furniture comprising only a post, a base plate and an energy-absorbing element, wherein the post and the base plate are shaped in such a manner that, when the post is loaded by an external force F just above the base plate, an obliquely, downwardly directed sliding movement of the post relative to the base plate is obtained, which is damped by the energy-absorbing element, not only in the lengthwise direction n of the street furniture, but also in the direction perpendicular to that lengthwise direction.

10 Claims, 12 Drawing Sheets

Fig. 10

IMPACT-RESISTANT AND ENERGY-ABSORBING ITEM OF STREET FURNITURE

TECHNICAL FIELD

The present invention relates to the field of items of street furniture and obstacles (street furniture devices), particularly those items of street furniture which are energy-absorbing and impact-resistant.

BACKGROUND ART

We are surrounded by many rigid items of street furniture which can be unintentionally collided with, resulting in damage not only to the rigid items of street furniture but also to the object (e.g. a vehicle) or in injury to the person who collides with the item of street furniture.

In the context of the invention the term "item of street furniture" covers, among other things, the following objects (the list is not exhaustive), all of which are either mounted on the ground or secured to a wall, namely:
 Poles or supports of traffic signs;
 Poles or supports of advertising boardings;
 Poles or supports of parking meters;
 Supports of sign boards or canopies;
 Protective posts which stand or are suspended in front of an object to be protected;
 Supports for conveyor belts;
 Supporting posts of guard rail structures or protective brackets;
 Posts for braking falling and/or rolling loads;
 Lamp posts;
 Poles or supports of traffic lights;
 And similar objects.

It is now known from a number of documents that such items of street furniture can be designed so that the consequences of minor collisions, contacts or gusts of wind can be limited. Indeed some items of street furniture bend completely so that the object or person which/who caused the collision is/are able to move over the item of street furniture. It is possible that such items of street furniture are energy-absorbing, but they are not impact-resistant in all cases.

However, the invention relates to an item of street furniture which on the one hand will limit this damage and/or injury in a collision/contact with both the item of street furniture and the colliding object or person in the case of minor collisions/contacts (this is the energy-absorbing part), whereupon the item of street furniture springs back into its normal position, whilst on the other hand the item of street furniture still performs a protective function from a defined degree of collision/contact, namely bringing the object or person which/who caused the collision/contact to a standstill (this is the impact-resistant part) without losing its resilient capacity.

The European patent EP-B-2 267 225 (Wolters) already describes such an item of street furniture, namely an impact-resistant and energy-absorbing protective post. In such an item of street furniture the number of parts is limited to the absolute minimum, namely three (a post, a base plate and an energy-absorbing element) and is additionally assembled by simply sliding the post, the base plate and the energy-absorbing element into one another and by simply anchoring the base plate to an existing ground surface (e.g. to the ground or to an existing floor) or to a wall. The sliding of these parts into one another is extremely simple because they are not fastened to one another, but only lie in contact with one another. In this connection it is pointed out that the terms "post" and "base plate", in the context of the invention, must be understood that they can be composed of different parts, parts which when in use form one unit, i.e. they are firmly connected to each other so that when in use no relative movement between these parts is possible.

The, preferably, absence of parts of the item of street furniture below ground level prevents submersion or the seeping in of water and the associated corrosion. When maintaining or replacing the few parts the item of street furniture can be dismantled in situ with simple tools and parts can be replaced if necessary. The energy-absorbing element is also located above ground in the item of street furniture in an easily accessible position.

Therefore the manufacture and use of the item of street furniture are simple, whilst it can be manufactured and repaired at low cost.

It is also important for the post to be the impact-absorbing element, i.e. practically every point on the post, throughout its length, can be an active point of application for the external forces which act on the item of street furniture with full retention of the impact and absorbing properties. These external forces may be either a vehicle, a person, the wind or the like.

The post may be the only impact-absorbing element, which means that part of the item of street furniture which can be moved by an object, a person or the wind, because the base plate is kept as low as possible, thus enabling a vehicle or a person to collide under normal circumstances only against the post and not against the base plate.

The range of the energy absorption of the individual item of street furniture can easily be adapted to changing circumstances by adjusting the energy-absorbing element in situ.

The colliding action may take place in two steps, namely a spring action followed, if necessary, by a rigid action.

In this state of the art, the base plate has to be kept as low as possible, so that under normal circumstances a vehicle or a person only can collide against the post and not against that base plate. The point or place of application for the external forces on the post can either be relatively high or relatively low with respect to the ground level, what will have an influence on the elastic action of the energy-absorbing element. When that point or place of application for the external forces is located on the post relatively high above the base plate, there is created a large pivoting- or tipping torque, that acts on the post, so that the post directly executes a pivoting- or tipping movement with respect to the base plate. When, however, the same external forces act now on a very low point or place of application of the post (i.e. just above the base plate) then the pivoting- or tipping torque, which acts on the post, is much lower when compared with the torque created with a normal point or place of application. Thereby, the post, which is always pressed against the base plate by the energy-absorbing element and which is additionally under the influence of the mostly horizontal external forces just above the base plate, will not solely be directly pivoted or tipped, but will also be shifted in the same direction as that of the external forces.

SUMMARY OF THE INVENTION

In order to take this shifting-phenomenon into account and also to further improve the result of the elastic action of the energy-absorbing element, when the point or place of application of the external forces on the post is very low (i.e. just above the base plate, for instance at a location positioned lower than 30% or lower than 20% or lower than 10% of the height of the post), the item of street furniture consists of a post, a base plate and an energy-absorbing element; wherein only the base plate is secured directly to an existing ground surface, to a foundation adapted for this purpose, to a wall or to a supporting structure and is provided with an hollow space; wherein the energy-absorbing element is located within the hollow space and is arranged with respect to the post and the base plate in such a manner that the energy-absorbing element presses the post and the base plate together at all times, thereby creating a first direct contact between the post and the base plate, as a result of which the item of street furniture is brought and maintained in the normal position, i.e. the energy-absorbing element releases the energy absorbed during the loading of the post by external forces when these external forces disappear; and wherein the energy-absorbing element also remains in direct contact at all times with the post (e.g. with the underside of the post) on the one hand and with the ground surface, the foundation, the wall, the supporting structure or the bottom plate of the base plate on the other hand; and wherein the post, the base plate and the energy-absorbing element are arranged relative to one another in such a manner that at the beginning of a movement of the post relative to the base plate, from the normal position of the item of street furniture, the energy-absorbing element is able to absorb this first movement without damage to the parts of the item of street furniture, and that when a defined limit value for the position of the post relative to the base plate is reached, a second direct contact is established between the post and the base plate and a further movement of the post relative to the base plate is no longer possible because, with further movement of the post from this defined limit position, a rigid whole is formed consisting of the post and the base plate, as a result of which the energy-absorbing element is not additionally loaded; characterised in that the post and the base plate are shaped in such a manner that, when the post is loaded, e.g. by an external force F, just above the base plate, an obliquely, downwardly directed sliding movement of the post relative to the base plate is obtained, which is damped by the energy-absorbing element. Preferably, the obliquely, downwardly directed sliding movement of the post relative to the base plate is damped by the energy-absorbing element not only in the lengthwise direction n of the item of street furniture, but also in the direction perpendicular to that lengthwise direction.

Due to that design, the elastic energy-absorbing element comes into action directly, not only vertically, but also horizontally. A vertical post has the possibility, when under the influence of an external force, to move directly against the elastic force of the adapted energy-absorbing element simultaneously in a horizontal as well as in a vertical direction, thus instead of solely having a direct pivoting- or tipping movement of the post with respect to the base plate, the post performs an obliquely downwardly directed sliding movement with respect to the base plate. Due to this obliquely downwardly directed sliding movement, the energy-absorbing element is directly used (damping), not only by the vertical component of the obliquely downwardly directed movement, but also, in some cases, by the horizontal component of that movement.

According to preferred embodiments the base plate is provided with a wall or tube, which encloses a hollow space and which either is on its upper side, i.e. in the direction of the post, provided with an inwardly directed flange or collar, or has itself a form, which is narrowing in the direction of the post, so that in both cases the hollow space is partially sealed in the direction of the post, creating thereby an opening, e.g. providing access to this hollow space.

According to preferred embodiments the underside of the post, i.e. in the direction of the base plate, is provided with an outwardly directed flange or collar having an outside diameter D which is greater than the diameter of the opening, and is e.g. located within the hollow space.

According to preferred embodiments the obliquely, downwardly directed sliding movement is obtained by the cooperation of the outside surface of the flange or collar of the post on the one hand and the inside surface of the flange or collar of the base plate and/or the inner surface of the wall or tube of the base plate on the other hand.

According to preferred embodiments the outside surface of the flange or collar of the post on the one hand and the inside surface of the flange or collar of the base plate and/or part of the inner surface or the inner surface of the wall or tube of the base plate on the other hand are bevelled.

According to preferred embodiments the obliquely, downwardly directed sliding movement is moving in a direction which forms a sharp angle $\beta$ to the normal n of the item of street furniture. Preferably the sharp angle $\beta$ is between 10° and 80°.

According to preferred embodiments the energy-absorbing element is shaped and/or adapted in such a manner to comprise an elastic part for being positioned or arranged in between the flange or collar of the post and the inner surface of the base plate at the level of the flange or collar of the post.

According to preferred embodiments the energy-absorbing element is shaped and/or adapted in such a manner to comprise an elastic part for being positioned or arranged into a recess in the underside of the post at the level of the flange or collar of the post.

According to preferred embodiments the post, the base plate and the energy-absorbing element are simply slid into one another so that they only lie against one another without being fastened to one another.

It should be clear that the embodiments according to the present invention have at least the same advantages as mentioned before for the items of street furniture disclosed in EP-B-2267225.

In the context of the invention the "normal position of the item of street furniture" is the position which the item of street furniture assumes when it is free and unloaded, i.e. without the influence of external forces, and a "rigid whole" is a unit of components or parts which can no longer move relative to one another, i.e. the post and the base plate may both be regarded as a rigid whole.

Also the terms "directed outwards" and "directed inwards" must be viewed from the center of the item of street furniture, thus on the one hand from the center viewed towards the outside, and on the other from outside to the centre.

DETAILED DESCRIPTION OF PREFERRED EMBODIMENT

The present disclosure will be described with respect to particular embodiments and with reference to certain drawings, but the disclosure is not limited thereto. The drawings are only schematic and are non-limiting. In the drawings, the size of some of the elements may be exaggerated for illustrative purposes and not drawn on scale. Specific and relative dimensions do not necessarily correspond to actual reductions to practice of the disclosure. The various embodiments are solely examples and are not limiting the scope of the invention.

Figure 1:
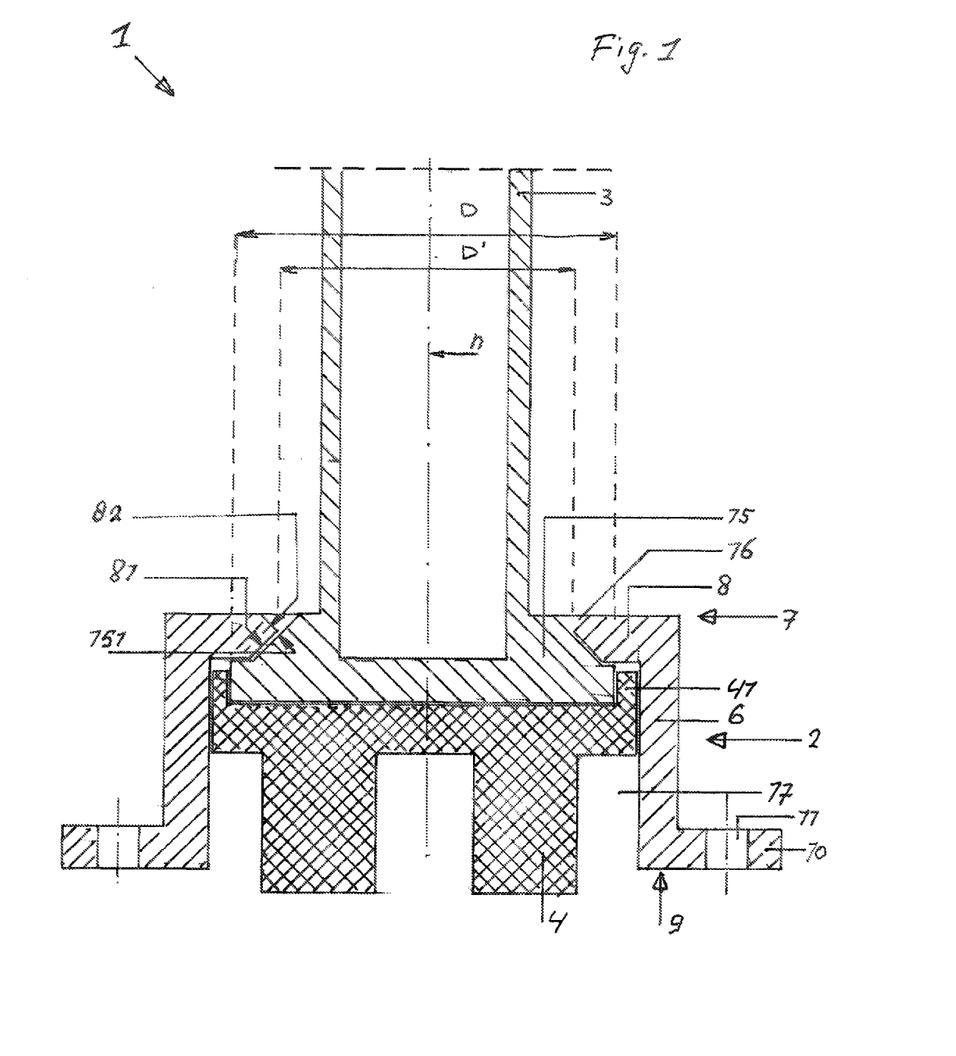
FIGS. 1 to 12 describe different embodiments of the invention.
Figure 2:
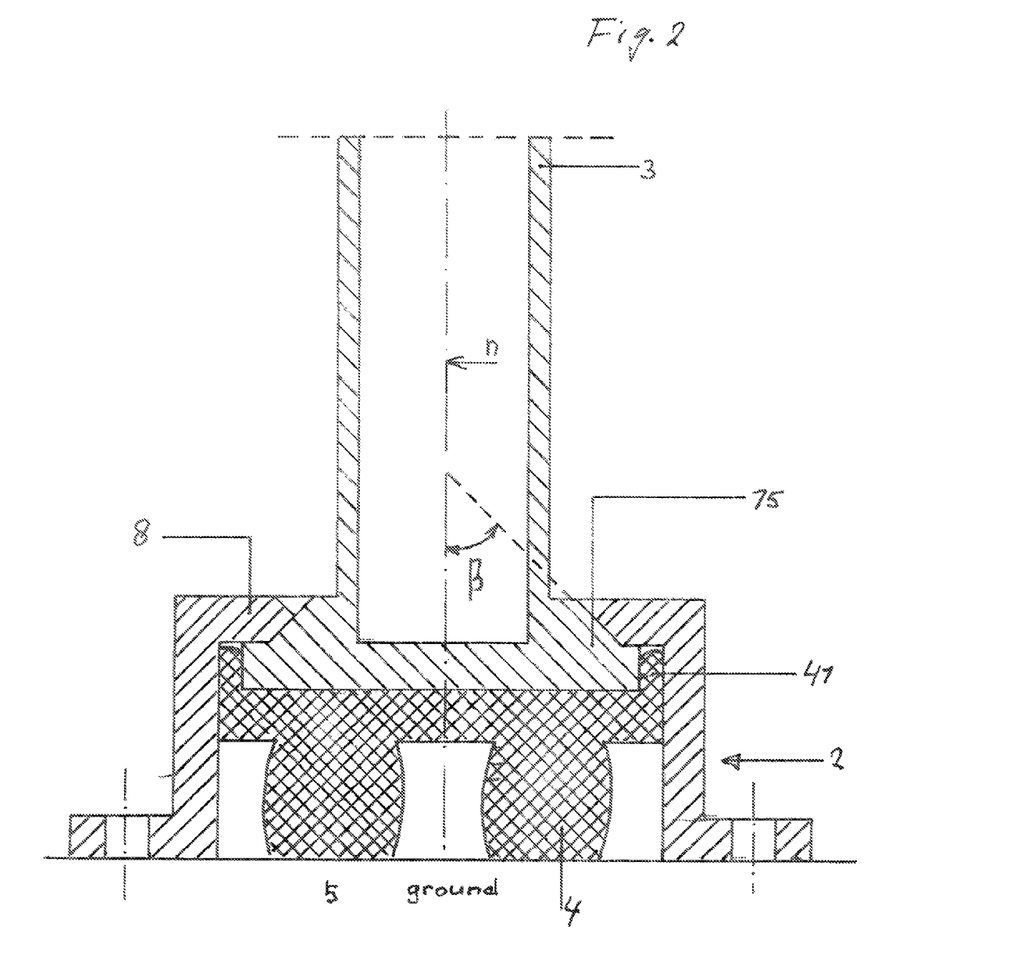
Figure 3:
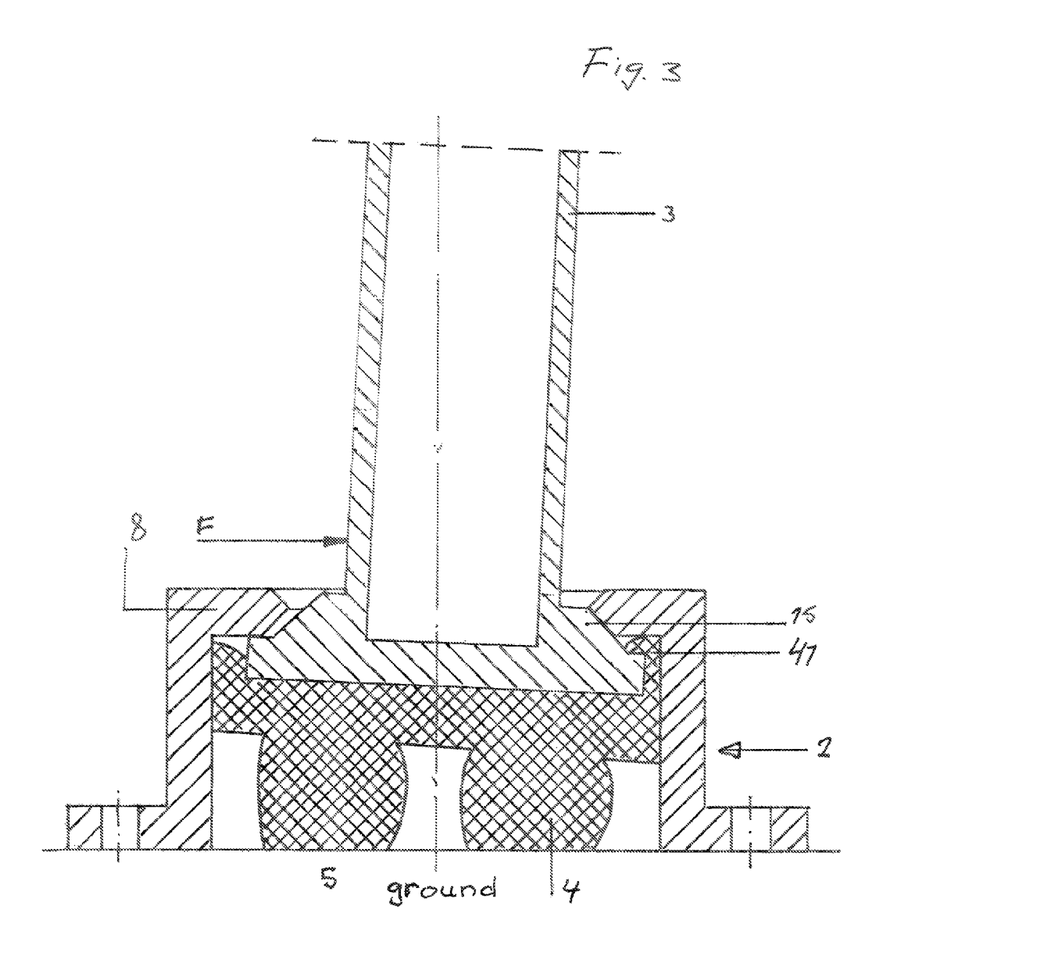
Figure 4:
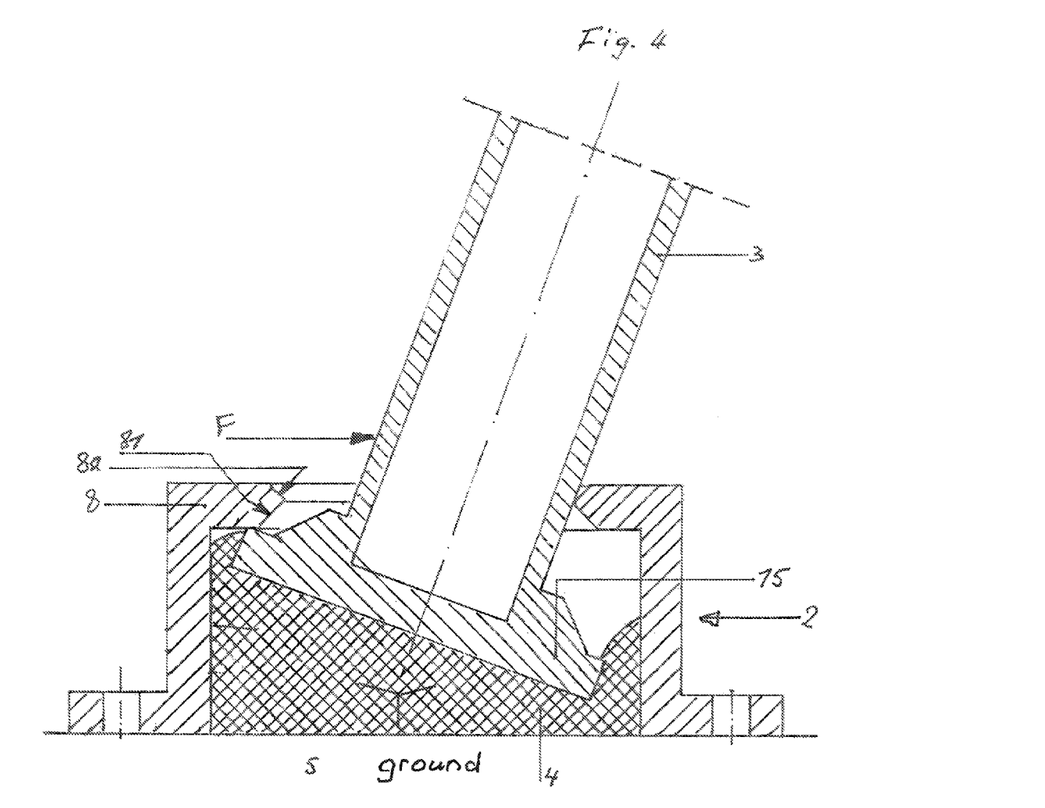

FIGS. 1 to 4 describe a first embodiment of an item of street furniture (1) according to the invention, whereby FIG. 1 shows the three parts of the item of street furniture in a non-mounted state, FIG. 2 the item of street furniture in a mounted state, FIG. 3 an energy-absorbing state of the item of street furniture under influence of an external force F and FIG. 4 the impact-resisting state of the item of street furniture.

The item of street furniture (1) consists exclusively of a post (3) which is movably connected to a base plate (2), a further energy-absorbing element (4) being fitted in the item of street furniture. These three components are not fastened to one another but simply slide into one another so that they only lie in contact with one another, as is clearly seen in FIGS. 1 and 2.

The base plate (2) is intended to be fastened to a base or the ground (existing flat ground surface 5 or a flat foundation adapted for this purpose), wall or a supporting structure. Normally the item of street furniture is not worked into the ground or in the wall but is placed on top of it and secured to the ground or wall surface. The base plate (2) therefore consists of a wall or tube (6) which encloses a hollow space (17) and which is provided at its one end (7) with an inwardly directed flange or collar (8) which partially seals the hollow space (17) in the direction of the post (3), thereby creating an opening (16) which provides access to this hollow space (17) and which, at its other end (9), can be provided with an outwardly directed fastening flange or collar (10), which is provided with bores or slots (11) for fastening the base plate (2) to the ground or wall surface (5) by means of screws or bolts. This fastening flange or collar (10) can be substituted by other fastening means to fasten the wall or tube (6) to the ground or wall surface (5). Other fastening means have no influence on the operation of the item of street furniture according to the invention.

In this embodiment the wall or tube (6) is cylindrical in shape and the hollow space (17) is arranged centrally. It is clear that other shapes for the wall or tube (6) and other positions of the hollow space (17) in the wall or tube (6) are also suitable in the context of the invention (see FIG. 12). Although the cross-section of a tube is in most cases circular in shape, this cross-section may also be polygonal or have any other shape in the context of the invention. The choice of the shape of the wall (6) which encloses the hollow space (17) is also completely free. This shape may, for example, be conical (see FIG. 5), bent, spherical, hemi-spherical, etc., in which case such shapes, in the direction of the post (3) (and for instance narrowing in the direction of the post), may terminate in the opening (16) of the hollow space (17), that is without that separate flange or collar (8). In a preferred design, the flanges and collars are directed radially. The flange or collar (8), as well as the flange or collar (15) of the post (3), interacting with one another may extend radially and outwardly or inwardly respectively. They also can be carried out obliquely (see FIG. 6). The length of the wall or tube (6) of the base plate (2) must be so small that practically all points of the post (3) may be an active point of application for the external forces which act on the item of street furniture, and not the base plate (2). It is also possible to arrange the opening (16) non-centrally, or to make it non-circular.

The base plate (2) may be both an assembly of different elements, such as, for example, tube sections, flanges, etc. which together do form a rigid whole, and may be cast in one piece.

The post (3), in the embodiment shown, is cylindrical. All other shapes for the post are of course possible and no limits are set with regard to the cross-section either. The post may be solid or hollow. This shape-independency provides the possibility of adapting the strength of the post to the circumstances of the use of the item of street furniture (1). The post (3) has, on its side facing the base plate (2), an outwardly directed flange or collar (15) which may also be arranged radially. When assembled, this flange or collar (15) is located in the hollow space (17) so that the post (3) projects through the opening (16), and this flange or collar (15) hooks on behind the inwardly directed flange or collar (8) of the base plate (2) because the outside diameter D of the flange or collar (15) is greater than the inside dimension D' of the flange or collar (8), which is also the diameter of the opening (16).

The dimensions of these interacting flanges and collars (8 and 15) hooking into one another (creating thereby a first direct contact between the post 3 and the base plate 2—see FIG. 2) are not only such that there is sufficient lateral clearance between the two parts, namely the flanges or collars of post (3) and base plate (2) on the one hand and respectively the wall or tube (6) and the post (3) on the other hand, to make possible a hinging movement (tipping movement) between the post (3) and the base plate (2) inside the hollow space (17) (see FIG. 3), but are also such that after a defined limit value for the position of the post (3) relative to the base plate (2) is reached, thus after a relative movement (e.g. a predetermined relative movement) of the post (3) and base plate (2) relative to one another, the post (3) comes into contact with the inner edge of the flange or collar (8) of the base plate (2), thereby creating a second direct contact between the post (3) and the base plate (2) (see FIG. 4), and so that, as a result of the first and second direct contact, a rigid whole is formed by the post (3) and the base plate (2) and this whole can only be moved further as a unit under the influence of a collision/impact. For this purpose the shape of the inner edge of the flange or collar (8) can be adapted to the shape of the post (3) to obtain a better contact (second direct contact). The adaptation may be achieved by bevelling (e.g. the inner edge of) the flange or collar (8) (see FIG. 1: surface 82).

To make the item of street furniture more suitable for external forces which collide with the post (3) just above the base plate (2), i.e. at a low height, creating thereby a pivoting- or tipping-torque which is not large, the co-operating elements, namely the flange or collar (15) of the post (3) and the base plate (2: flange or collar 8 or wall or tube 6), are shaped in such a way, that as a consequence of the low point or place of application of the external forces on the post (3), the post (3) is forced to move in an obliquely, downwardly directed sliding movement (direction β—see FIG. 2). To obtain this movement, the outer surface (151) of the collar (15) of the post (3) and the inner surface (81 or 61) of the collar (8) and/or the wall or tube (6) can be bevelled (see FIG. 11: surface 61).

The direction of this damped, obliquely, downwardly directed sliding movement is preferably predetermined to be under a sharp angle β to the normal (n) (the normal n being the direction perpendicular to a plane representative of the ground plane).

Preferably, the sharp angle β can be within the range of 10° to 85°. Each value within this range is appropriate and depends on the circumstances of the use of the item of street furniture.

An energy-absorbing element (4) is provided in the hollow space (17) and is arranged in this hollow space (17) so that, when assembled (see FIG. 2), it presses the post (3) and the base plate (2) always against one another in order to bring and maintain the item of street furniture in the normal position, i.e. the energy-absorbing element (4) has a resilience, the absorbed energy being released when the external forces disappear. Because of this pressing against one another a first direct contact is established between the post (3) and the base plate (2), inter alia by means of their inclined surfaces (151 and 81). The energy-absorbing element (4) is in this embodiment positioned between the post (3) on the one hand and the ground or floor surface (5) to which the base plate (2) is secured on the other. Alternatively, the base plate (2) can be provided with a bottom plate which seals the hollow space (17) in the base plate (2) at the bottom (see FIG. 9 in EP-B-2267225). This bottom plate must be releasably connected to the rest of the base plate (2) to enable the post (3) to be inserted through the opening (16) when the item of street furniture is assembled. The post (3) lies with its underside directly against the energy-absorbing element (4). The energy-absorbing element (4) is also provided, at the level of the flange or collar (15), with a part (41) located between the flange or collar (15) of the post (3) on the one hand and the wall or tube (6) (e.g. the inside of the wall or tube) of the base plate (2) on the other, so that even with a lateral (horizontal) movement of the post (3) in the direction of the wall or tube (6) of the base plate (2) a damped movement is obtained. This part (41) additionally centres the energy-absorbing element (4) in the hollow space (17).

The energy-absorbing element (4) can be assembled in different ways and can have all kinds of shapes. For example, it may be a homogeneous block manufactured from one rubber or another, elastomer or any other material with resilient and/or damping properties, or it may be constructed in different layers of elastic material with varying elasticity and/or damping properties (see in that respect EP-B-2267225). In certain cases it may be interesting to use an elastic material which is elastically deformable, but incompressible or hardly compressible, so that during the deformation under an impact only the shape of the elastic material is changed, whilst its volume remains unchanged or almost unchanged because the volume cannot be compressed or can hardly be compressed due to its incompressible nature. With such an elastic material it is simple to estimate in advance the relative movement between the post (3) and the base plate (2). The energy which is absorbed during this relative movement is released, when the external forces (impact or wind load) disappear, returning the post (3) and hence the item of street furniture (1) to its normal position. It is clear that many designs are possible where the damping and resilient properties of the energy-absorbing element (4) can be adapted as a function of the behaviour of the item of street furniture to be achieved upon impact. The energy-absorbing element (4) may or may not be secured to either the post (3) or the base plate (2) and may be composed of different deformable and elastic materials.

The functioning of the item of street furniture according to the invention is simple and will be described hereinafter. In FIG. 2 the item of street furniture is in a mounted condition where it is left undisturbed. In this case the item of street furniture stands vertically upright, wherein the resilience in the energy-absorbing element (4) on which the post (3) is supported ensures not only that this vertical position is maintained as long as no forces F (e.g. impact or wind load) are exerted on the item of street furniture, but also that a first direct contact is established between the post (3) and the base plate (2). If an external force F is now exerted, e.g. in a direction transverse to the item of street furniture (see FIG. 3), e.g. as a result of a collision by a vehicle or the like, the energy-absorbing element (4) will in the first instance be compressed at its right hand side, while it still presses with its left hand side the flange or collar (15) against the flange or collar (8) (the so-called first direct contact), absorbing impact energy during the collision because of the damping properties of the energy-absorbing element (4). Consequently the collision will be much less violent for a driver sitting in the vehicle, the greatest shock during the impact of the vehicle with the item of street furniture being broken. Of course the post (3) and the base plate (2) will move relative to one another as a result of the compression and deformation of the energy absorbing element (4). This relative movement between the post (3) and the base plate (2) is made impossible once a defined limit value for the position of the post (3) relative to the base plate (2) is reached (see FIG. 4). At that moment the post (3) lies with its outside against the inner edge of the flange or collar (8) of the base plate (2), thereby creating a second direct contact between the post (3) and the base plate (2) (see FIG. 4). Because the energy-absorbing element (4) continuously presses or always attempts to press the flange or collar (15) of the post (3) against the flange or collar (8) of the base plate (2) (first direct contact), and because, as a result of the impact (F), the post (3) tilts so that at a certain time it comes into contact, on its outside, with the flange or collar (8) of the base plate (2) (second direct contact), a rigid whole is obtained. That rigid whole is obtained because firstly the flanges (8 and 15) have a contact point with one another (first direct contact), and because secondly another contact (second direct contact) is established between the outside of the post (3) and the inner edge of the flange or collar (8) of the base plate (2). This contact pivot (first direct contact) together with that last contact (second direct contact) prevent further movement of the post (3) relative to the base plate (2) since a rigid whole, consisting of the post (3) and the base plate (2), is obtained. Such a condition is represented in FIG. 4. Another advantage of this rigid whole is that the energy-absorbing element (4) cannot be deformed further and no plastic destruction can take place, as otherwise the resilience of the energy-absorbing element (4) would be lost. The energy-absorbing element (4) in the hollow space (17) in the base plate (2) therefore forms, in fact, a type of hinge with a damping action, wherein, when a force is exerted transversely to the item of street furniture, the energy-absorbing element (4) is deformed in such a manner that the post (3) undergoes from this hinge an angular rotation relative to the unloaded condition until a defined limit position and thus the second direct contact is reached.

If the external force F is acting on the post (3) just above the base plate (2) and thus the pivoting- or tipping torque will be small, the pivoting- or tipping-movement of the post (3) relative to the base plate (2) will be combined with a movement of the post (3) relative to the base plate (2) in the direction β, due to an obliquely, downwardly directed movement which is the result of cooperating elements (151 on the one hand and 81 or directly the inside 61—FIG. 11—of the wall or tube 6 on the other) of the item of street furniture (1).

Due to these movements, the energy-absorbing element (4-41) is compressed not only by the vertical component of these movements, but also by their horizontal components. The energy absorption, resulting from this damped vertical component, is increased by forming the energy-absorbing element (4-41) so that also in horizontal direction a damping and thus energy absorption takes place. Part (41) of the energy-absorbing element (4) is therefore, partly or completely, located, at the level of the flange or collar (15) of the post (3), between that flange or collar (15) of the post (3) on the one hand and the inside of the wall or tube (6) of the base plate (2).

To optimize this lateral damping, the compressibility of part (41) can be adapted and different from the material used for the rest of the energy-absorbing element (4).

It is clear that when the energy-absorbing element (4) consists of less compressible materials, more force will be required to obtain deformation, so that such materials should preferably be used in applications where the impact may be great or the movement between the post (3) and the base plate (2) is to be considerable limited. Conversely in the case of easily compressible materials (4) it will require relatively little force to obtain deformation of the energy absorbing element (4), so that the so-called defined limit value for the position of the post (3) relative to the base plate (2) is reached very quickly.

A further advantage of the item of street furniture according to the invention is that the energy absorbing element (4) is enclosed in the hollow space (17), thereby protecting it from weather conditions so that it is not greatly subject to weathering and/or degeneration, which means that its energy-absorbing capacity, as well as its resilience, are not lost.

In the example shown, the item of street furniture (1) is constructed symmetrically so that the behaviour of the item of street furniture is always the same in the event of a collision from any direction. According to the invention, of course, this need not always be the case, and the material of the energy-absorbing element (4) could be different in a certain direction from the material used in another direction in order to ensure that the item of street furniture behaves differently in different directions.

The item of street furniture according to the invention has a very simple structure since it consists only of a post (3), a base plate (2) and an energy-absorbing element (4). It can therefore be manufactured and repaired very inexpensively and is therefore suitable for all kinds of applications. The assembly of the item of street furniture is also extremely simple since the three parts are not fastened to one another but simply lie against one another. In fact, the three parts are simply slid into one another. Because there is a mechanical limitation, because of the first and second direct contact, which emerges into a rigid whole of the post (3) and base plate (2), the degree of deformation of the energy-absorbing element (4) is limited, of course, below the maximum permissible degree of deformation of the energy-absorbing element (4). As a result of this the energy-absorbing element (4) always has the same action and does not lose its resilience.

It is also clear that additional parts can be added to the item of street furniture according to the invention, without influencing its inventive functioning. For example, the post (3) can be provided with an elastic element (e.g. a bellow) to close the opening (16) completely, so that the energy-absorbing element (4) is even better protected. Also the fastening flange or collar (10) can be substituted by some angle brackets, which are provided with bores and/or slots.

These angle brackets can be mounted, e.g. directly, on the wall or tube (6) on the one hand and on the ground (5) or wall surface on the other.

Figure 5:
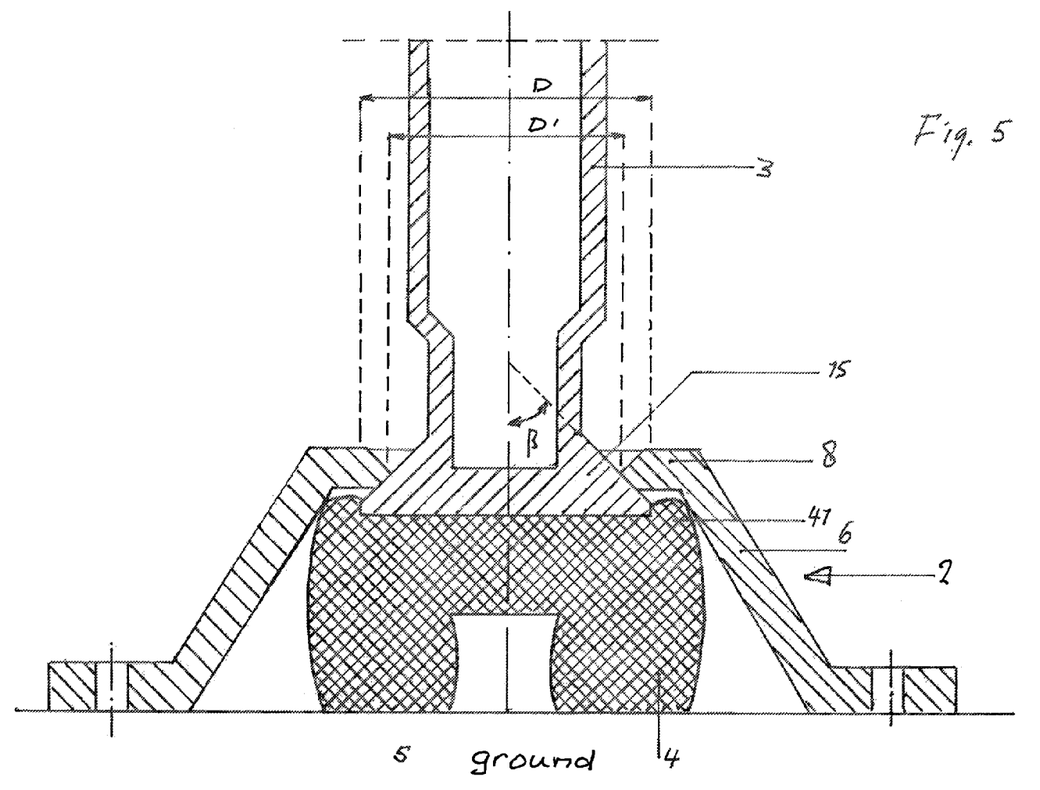
Figure 6:
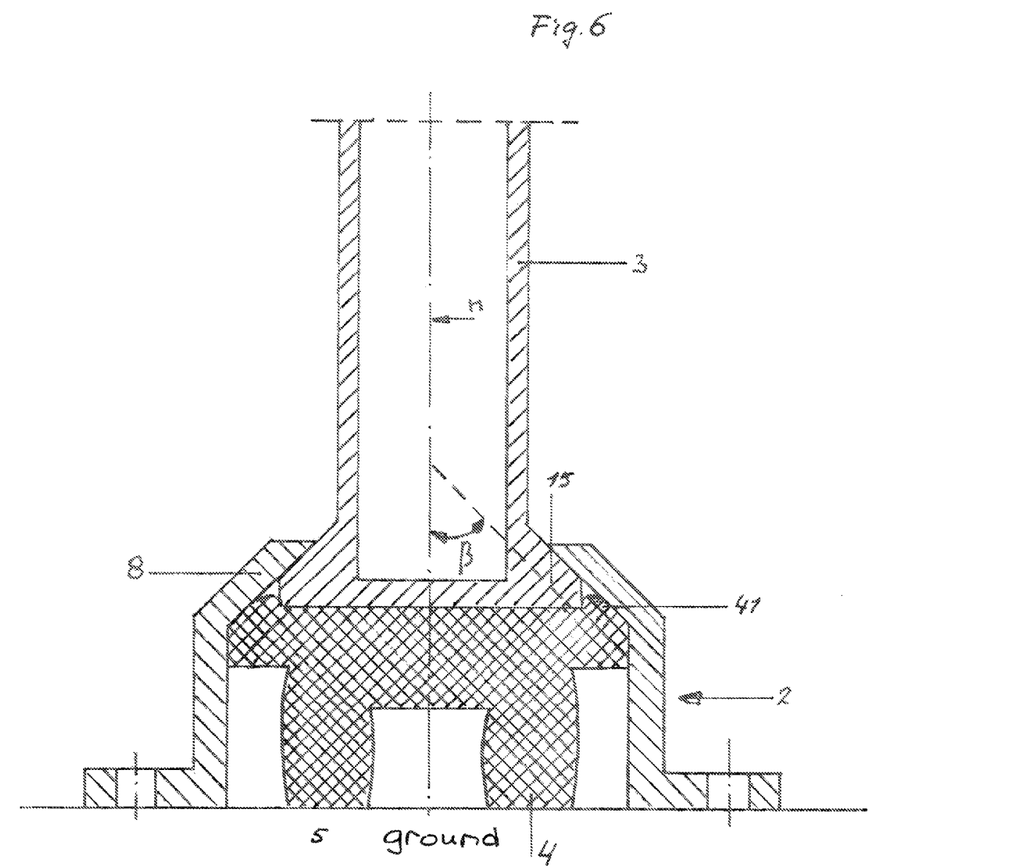

FIGS. 5 and 6 show further embodiments of an item of street furniture according to the invention. In FIG. 5 the base plate (2) consists of a conical wall or tube (6), while in FIG. 6 the flange or collar (8) extends obliquely, rather than radially.

Figure 7:
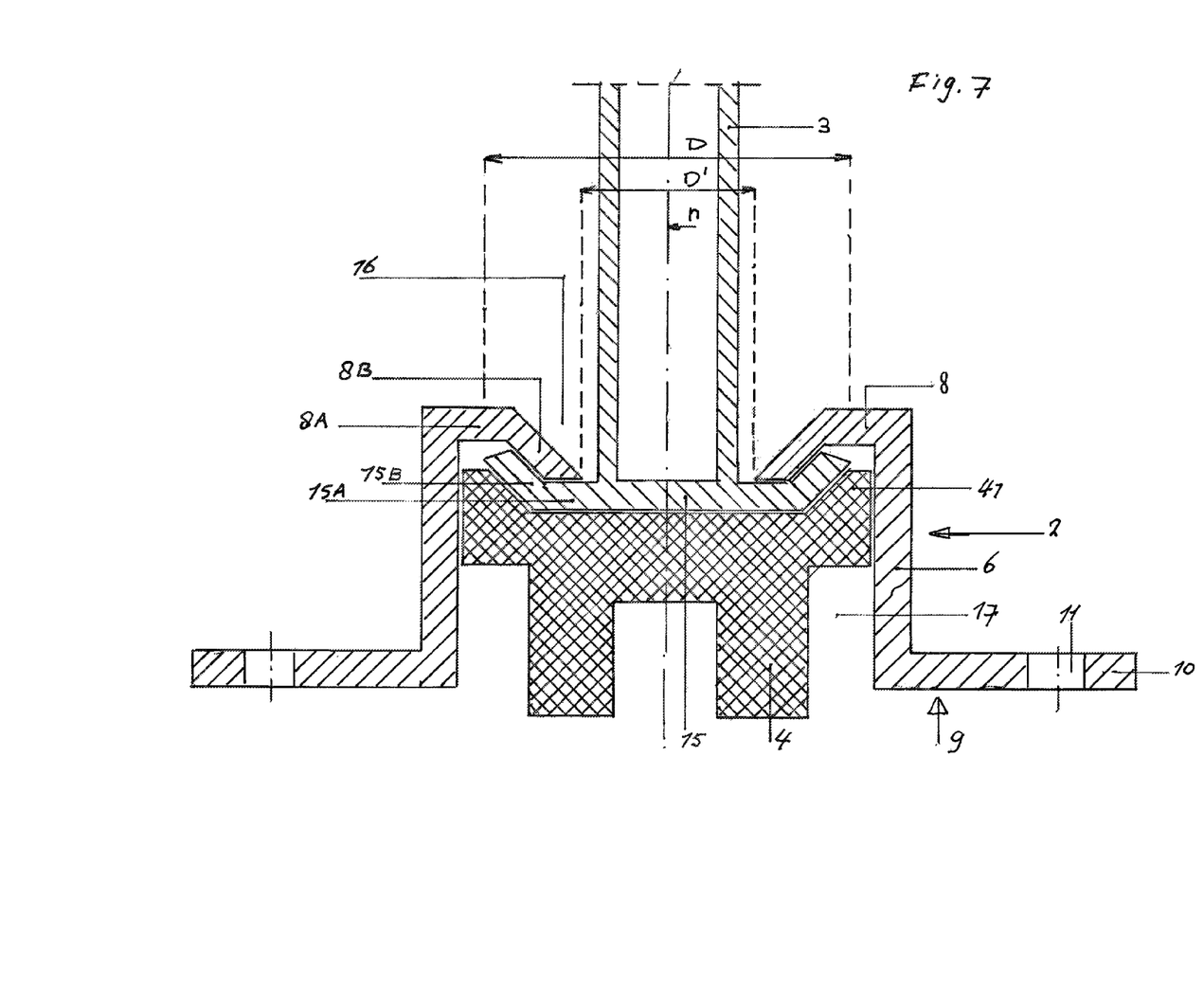
Figure 8:
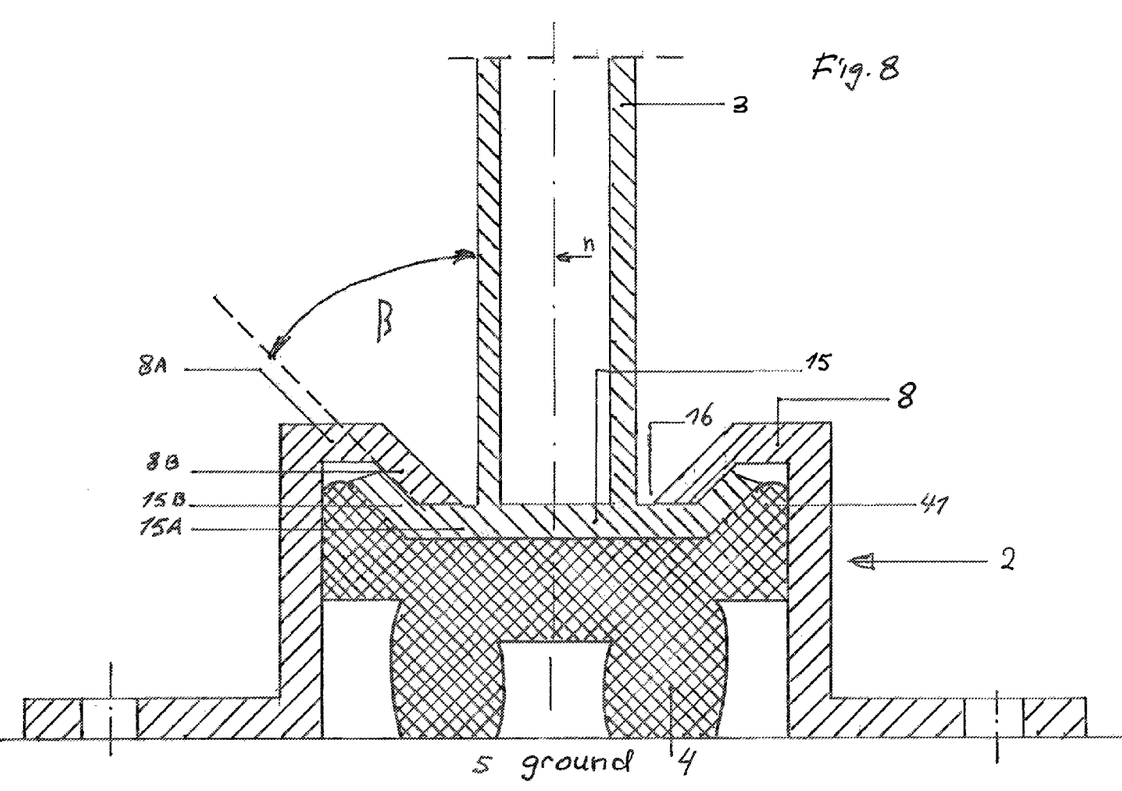

FIGS. 7 (non-mounted state) and 8 (mounted state) show further embodiments of the item of street furniture according to the invention, whereby the flanges or collars (8 and 15) are configured differently. Instead of radial (see FIG. 1) or oblique (see FIG. 6) flanges or collars (8 and 15), these flanges or collars each have a radial (8A and 15A) and an oblique part (8B and 15B), whereby the oblique parts (8B and 15B) cooperate with one another to obtain the damped, obliquely, downwardly directed sliding movement (in the direction β), when an external force is exerted on the post (3) just above the base plate.

Figure 9:
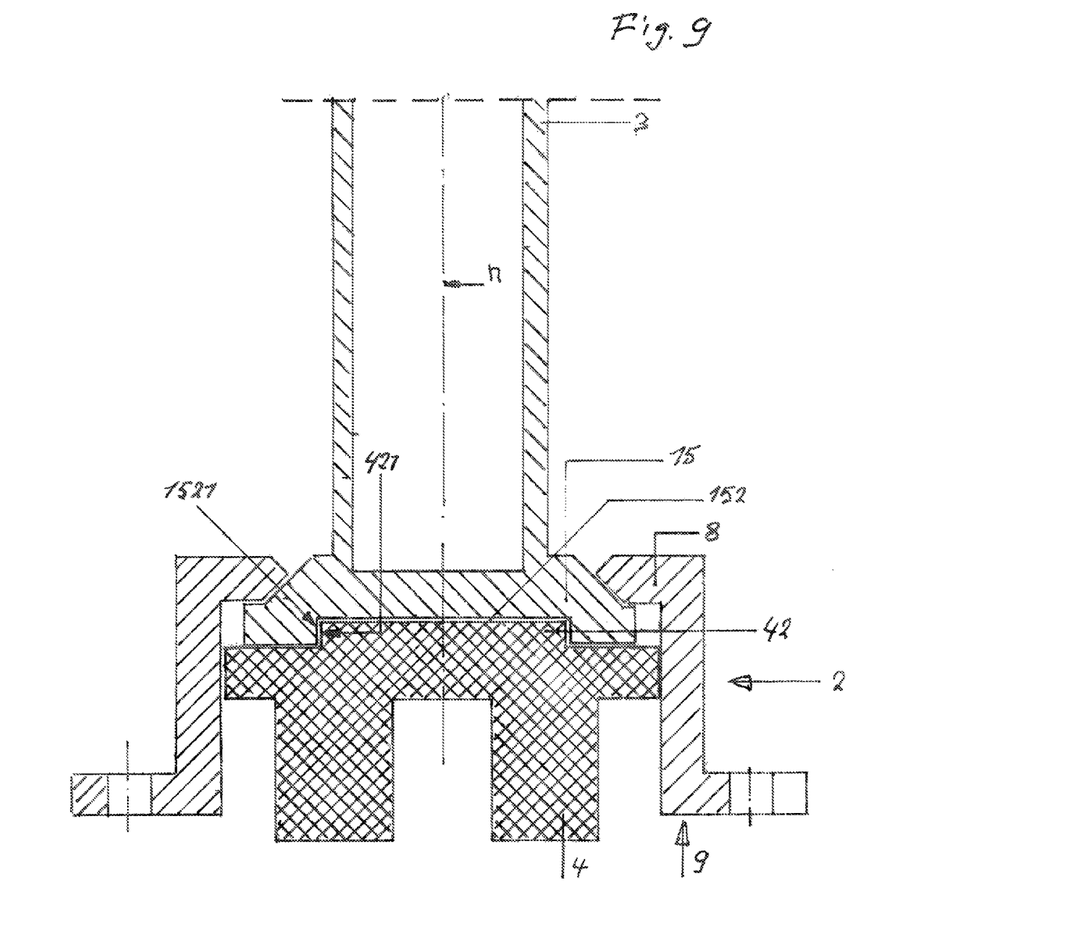
Figure 10:
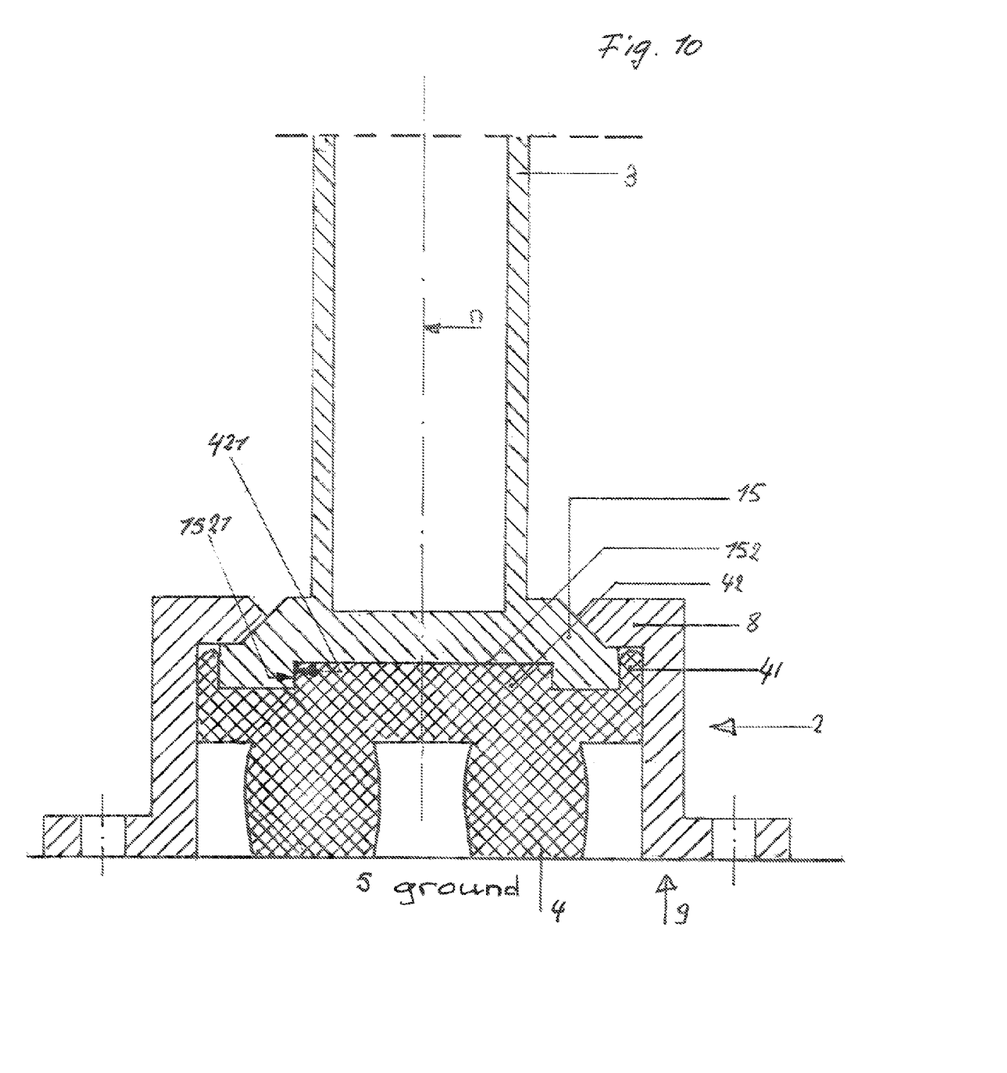

In FIGS. 9 (non-mounted state) and 10 (mounted state), alternatives are shown for part (41) of the energy-absorbing element (4). These alternatives show a modified flange or collar (15) of the post (3). The post (3) is, at its underside, at the level of its flange or collar (15), provided with a recess (152), wherein is located another elastic part (42) of the energy-absorbing element (4), so that this elastic part (42) can damp a lateral movement of the post (3). This elastic part (42) takes over the function of elastic part (41) in FIG. 2. When an external force acts on the post (3) from the left hand side (as shown in FIGS. 3 and 4), the side-surface (421) of the elastic part (42) cooperates with the side-surface (1521) of the recess (152). In FIG. 10, both parts (41 and 42) are used together to even improve the damping of a lateral movement.

Figure 11:
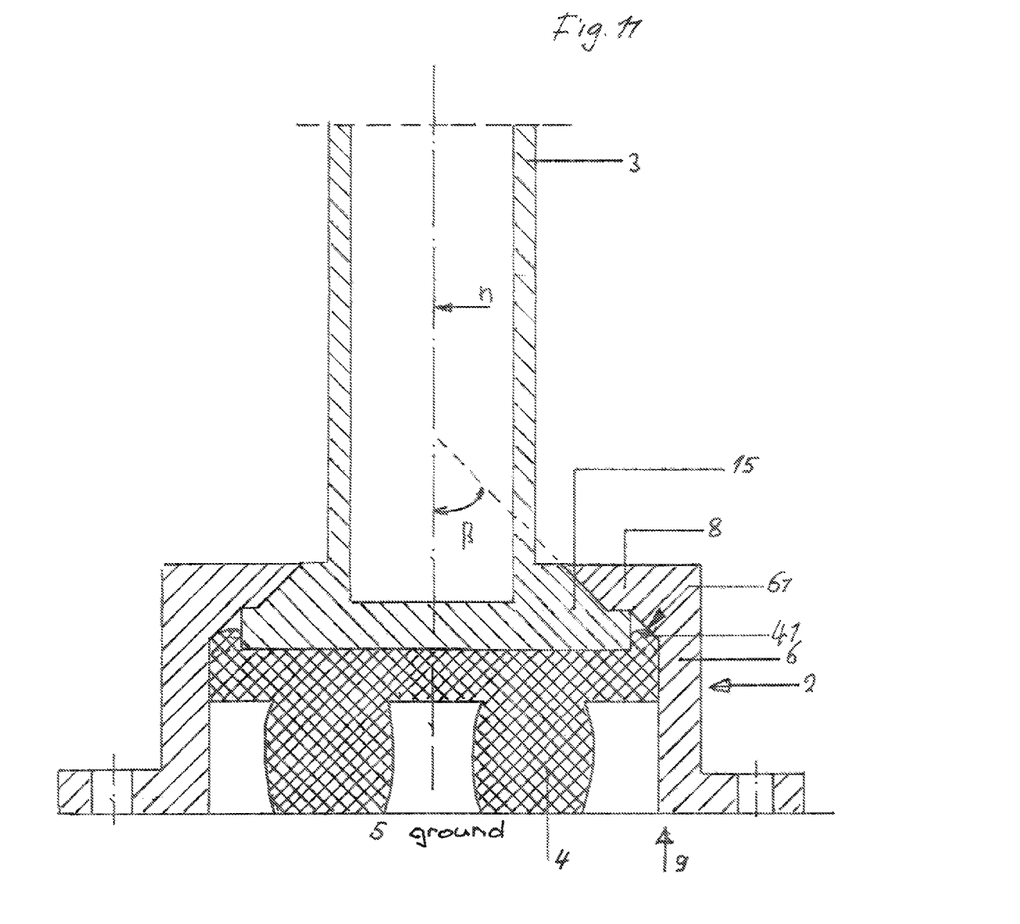

In FIG. 11, the wall or tube (6), in the area connecting the wall or tube (6) with the flange or collar (8), is adapted in such a manner that a connecting part can cooperate with the outside end of the flange or collar (15) of the post (3) to obtain the damped, obliquely, downwardly directed sliding movement.

Figure 12:
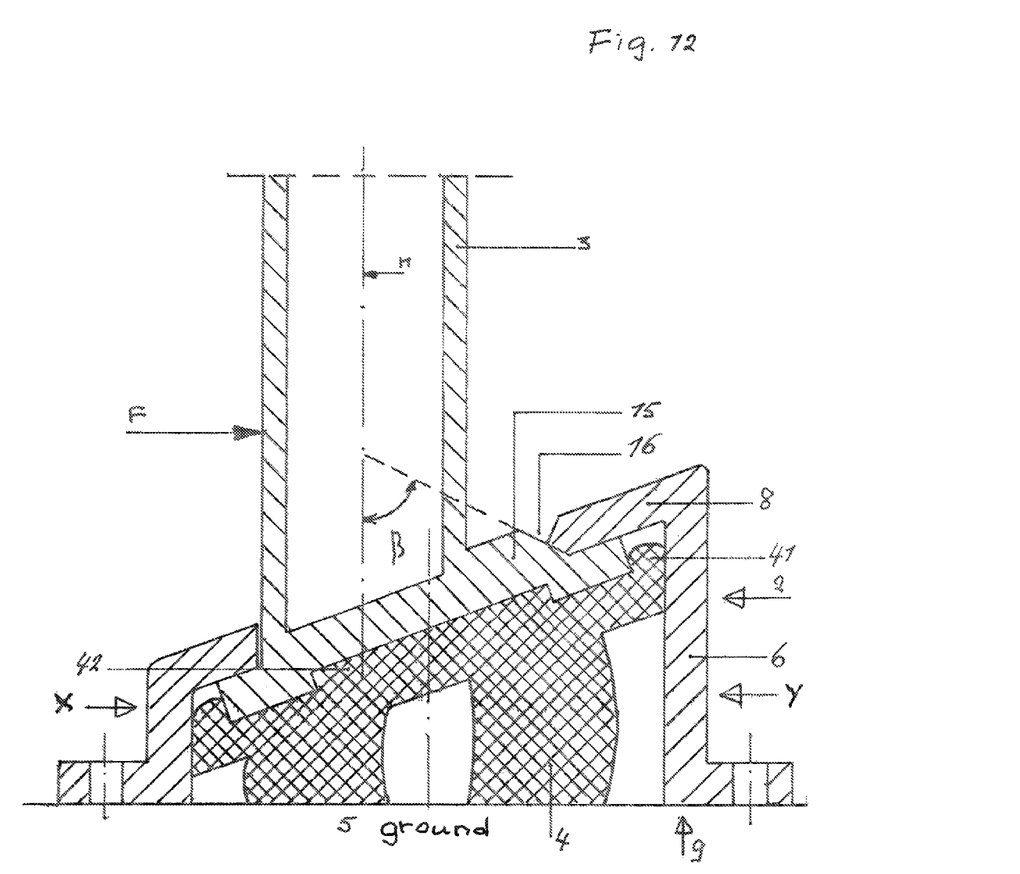

FIG. 12 shows a possible embodiment of the item of street furniture according to the invention that can be positioned along a road. In order to avoid that cars touch the base plate (2), the base plate is kept extremely low on its vehicle side (X) (i.e. along the road), but its height is increased on its opposite side (Y) in order to be able to provide sufficient damping material (4). The flanges or collars (8 and 15), as well as the location of the post (3) in the opening (16), are adapted to this base plate configuration. The post (3) is not centrally located, so that the post (3) has sufficient space to tilt up to a predetermined position of the post, where the post (3) and the base plate (2) form a rigid whole. It will be clear, that this base plate configuration can also be used with either solely elastic part (41) or solely elastic part (42).

This embodiment is a typical example that shows that the configuration of the base plate (2), and e.g. also of the post, can be adapted to the circumstances of the location where the item of street furniture (1) has to be positioned, and that without changing the basics of the present invention, namely the presence of firstly a permanent first direct contact that allows the pivoting movement of the post (3) and the therewith connected energy absorption and secondly the obtainment of a rigid whole, by means of the first and second direct contacts, that causes the impact-resistant character of the item of street furniture.

The item of street furniture may be used not only in the technical fields indicated in the preamble of the description but may also be used, for example, in locations with slow traffic, such as in car parks and in shopping centres, to protect machines and installations, for all kinds of internal and external transport equipment, and even for protecting against vandalism, due to its blocking function.

It will be appreciated that the use of street furniture devices according to aspects of the present invention may be especially advantageous in certain application fields where typically a collision at low height is expected to occur, as for instance, but not only:

the use as supporting posts of guard rail structures or protective brackets, when those have to be adapted for low impact as for instance is the case when used to stop motor bikes and their drivers when sliding; or the use of posts in combination with lift trucks, which typically have counter weights at low height on their backside.

The invention is by no means limited to the items of street furniture described as examples and shown in the figures, but items of street furniture according to the invention may also be realised in many different ways.

The invention claimed is:

1. An item of street furniture comprising three parts, said parts being a post, a base plate having a flange or collar and an energy-absorbing element;

wherein only the base plate is secured directly to an existing ground surface, to a foundation, to a support wall or to a supporting structure and is provided with a hollow space formed by the post, an inner wall of the base plate and the ground surface, foundation, support wall, or supporting structure;

wherein the energy-absorbing element is located within the hollow space and is arranged with respect to the post and the base plate in such a manner that the energy-absorbing element presses the post and the base plate together at all times, thereby creating a first direct contact between the post and the base plate, as a result of which the item of street furniture is brought and maintained in a normal position, wherein the energy-absorbing element releases the energy absorbed during the loading of the post by external forces when these external forces disappear; and wherein the energy-absorbing element also remains in direct contact at all times with the post and with the ground surface, the foundation, the support wall, or the supporting structure;

and wherein the post, the base plate and the energy-absorbing element are arranged relative to one another in such a manner that at the beginning of a movement of the post relative to the base plate, from the normal position of the item of street furniture, the energy-absorbing element is able to absorb this first movement without damage to the parts of the item of street furniture, and that when, after a relative movement of the post and the base plate relative to one another, the post comes into contact with an inner edge of the flange or collar of the base plate defining a limit value of range for the position of the post relative to the base plate, a second direct contact is established between the post and the base plate and a further movement of the post relative to the base plate is no longer possible because, with further movement of the post from this defined limit position, a rigid whole is formed consisting of the post and the base plate, as a result of which the energy-absorbing element is not additionally loaded;

wherein the post and the base plate are shaped in such a manner that, when the post is loaded just above the base plate, an obliquely, downwardly directed sliding movement of the post relative to the base plate is obtained, which is damped by the energy-absorbing element.

2. An item of street furniture according to claim 1, wherein the base plate is provided with a wall or tube, which encloses the hollow space and which either on its upper end, i.e. in the direction of the post, is provided with an inwardly directed flange or collar, or has itself a form, which is narrowing in the direction of the post, so that in both cases the hollow space is partially sealed in the direction of the post, creating thereby an opening providing access to this hollow space.

3. An item of street furniture according to claim 2, wherein the underside of the post in the direction of the base plate, is provided with an outwardly directed flange or collar having an outside diameter which is greater than the diameter of the opening, and is located within the hollow space.

4. An item of street furniture according to claim 1, wherein the obliquely, downwardly directed sliding movement is obtained by the cooperation of outside surface of the flange or collar of the post and the inside surface of the flange or collar of the base plate and/or the inner surface of the wall or tube of the base plate.

5. An item of street furniture according to claim 4, wherein the outside surface of the flange or collar of the post on the one hand and the inside surface of the flange or collar of the base plate and/or part of the inner surface of the wall or tube of the base plate (2) on the other hand are bevelled.

6. An item of street furniture according to claim 1, wherein the obliquely, downwardly directed sliding movement is moving in a direction which forms a sharp angle to the normal of the item of street furniture, the normal being the direction perpendicular to a plane representative of the ground plane.

7. An item of street furniture according to claim 6, wherein the sharp angle is between 10° and 80°.

8. An item of street furniture according to claim 1, wherein the energy-absorbing element is shaped and/or adapted in such a manner to comprise an elastic part for being positioned or arranged in between the flange or collar of the post and the inner surface of the base plate at the level of the flange or collar of the post.

9. An item of street furniture according to claim 1, wherein the energy-absorbing element is shaped and/or adapted in such a manner to comprise an elastic part for being positioned or arranged into a recess in the underside of the post at the level of the flange or collar of the post.

10. An item of street furniture according to claim 1 wherein the post, the base plate and the energy-absorbing element are simply slid into one another so that they only lie against one another without being fastened to one another.

* * * * *